H. Yerty,
Milk House.
No. 68,276. Patented Aug. 27, 1867.
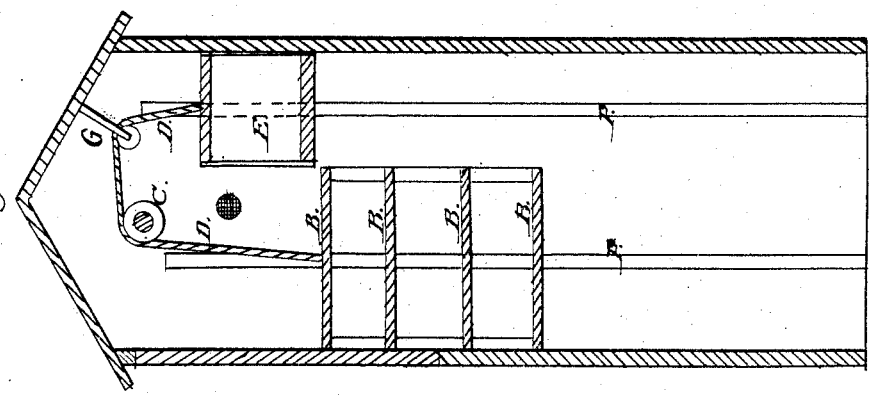
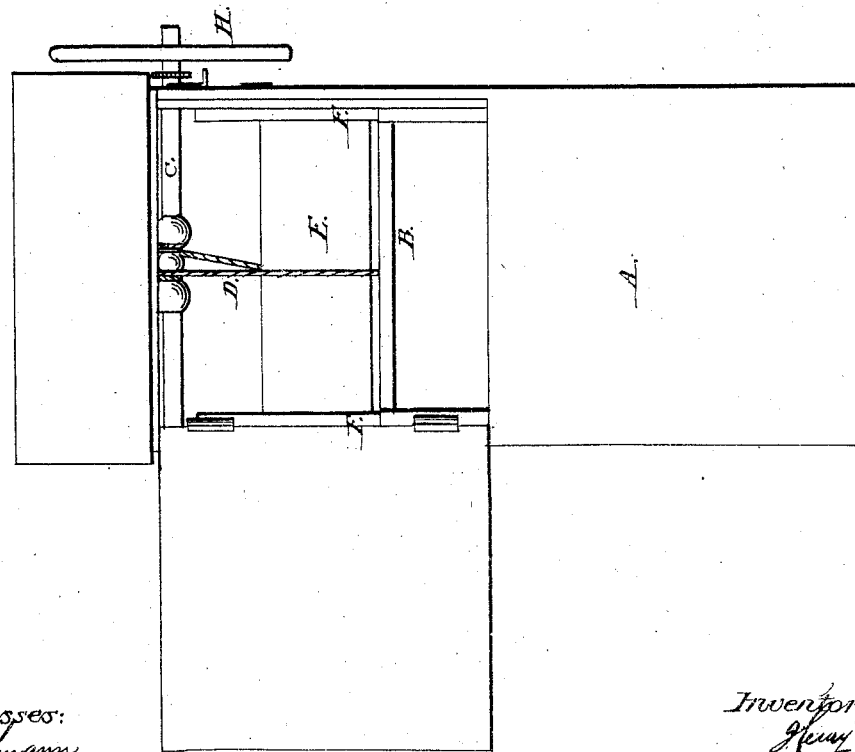

United States Patent Office.

HENRY YERTY, OF COVINGTON, OHIO.

Letters Patent No. 68,276, dated August 27, 1867.

---

IMPROVEMENT IN MILK-HOUSES.

---

*The Schedule referred to in these Letters Patent and making part of the same.*

---

TO ALL WHOM IT MAY CONCERN:

Be it known that I, HENRY YERTY, of Covington, State of Ohio, have invented certain new and useful Improvements in Milk-Houses; and I declare the following to be a full, true, and exact description of the same, reference being had to the accompanying drawings, and to the letters of reference marked thereon.

Figure 1 represents a front elevation of my invention.

Figure 2 is a section view of the same.

Letter A represents a cistern, which is sunk into the earth to any desired depth, and should be walled up with brick or stone, and cemented, so as to prevent moisture from soaking through. Over the top of this cistern there is placed a house, of any desired shape and size, which should be provided with a door that extends across the whole width of the house, as seen in fig. 1, and should fit tightly, so as to prevent insects and vermin from entering. This house can be constructed entirely of wood, and then sunk through the floor into the cellar, so that the milk is always handy and convenient.

Letter B represents a set of shelves, which are so constructed that they can be lowered or raised by means of the windlass C, to which they are attached by means of the rope D. To counterbalance the weight of these shelves, the box E has been fastened to the other end of the rope D after being passed around the windlass. This box should be just heavy enough to balance the shelves when both are empty, and is intended to contain weights so as to equalize the load that is placed upon the shelves. In order to prevent them from swinging around or jostling, the slides I have been attached to the sides of the house, which fit in grooves in the ends of the shelf and box so as to prevent all possibility of the milk being upset or spilled. From the roof extends the arm G, which is provided with a roller so that the rope D can act more directly upon the box while being lowered or raised. To the end of the windlass C is attached a wheel or crank, H, by which the windlass is operated, and in order to retain the shelves in any desired position or height, has also been provided with a ratchet-wheel and pawl. The sides of the house are perforated in several places so as to constantly admit fresh air. The openings should be covered with fine wire gauze so as to prevent insects, &c., from getting into the milk.

By the use of my invention milk can always be preserved in any season and in all kinds of weather, while butter can be always kept from becoming rancid and soft, and meat be prevented from becoming fly-blown.

Having thus described my invention, what I claim, and desire to secure by Letters Patent, is—

The within-described milk-house, constructed substantially as and for the purpose specified.

In testimony that I claim the above I set my signature in presence of two witnesses.

HENRY YERTY.

Witnesses:
   JOSEPH MARLIN,
   RUSH REYNOLDS.